(12) United States Patent
Liesenfeld et al.

(10) Patent No.: US 12,623,714 B2
(45) Date of Patent: May 12, 2026

(54) HOUSING COVER UNIT FOR A TRANSMISSION AND POWER STEERING DRIVE HOUSING, AND STEERING UNIT FOR A VEHICLE

(71) Applicants: ZF Automotive Germany GmbH, Alfdorf (DE); ZF Automotive UK Limited, Solihull (GB)

(72) Inventors: Guido Liesenfeld, Neuss (DE); Vamsi Adabala, Düsseldorf (DE); Musthafa Hathiari, Rowley Regis (GB)

(73) Assignees: ZF Automotive Germany GmbH, Alfdorf (DE); ZF Automotive UK Limited, Solihull (GB)

( * ) Notice: Subject to any disclaimer, the term of this patent is extended or adjusted under 35 U.S.C. 154(b) by 615 days.

(21) Appl. No.: 18/078,215

(22) Filed: Dec. 9, 2022

(65) Prior Publication Data

US 2023/0182806 A1 Jun. 15, 2023

(30) Foreign Application Priority Data

Dec. 9, 2021 (DE) .......................... 102021214051.3

(51) Int. Cl.
*B62D 5/04* (2006.01)
(52) U.S. Cl.
CPC ......... *B62D 5/0406* (2013.01); *B62D 5/0409* (2013.01); *B62D 5/0454* (2013.01); *B62D 5/0481* (2013.01)

(58) Field of Classification Search
CPC .. B62D 5/0406; B62D 5/0409; B62D 5/0454; B62D 5/0481; B62D 5/0403
See application file for complete search history.

(56) References Cited

U.S. PATENT DOCUMENTS

| | | | | |
|---|---|---|---|---|
| 2004/0065163 | A1* | 4/2004 | Takahashi | B62D 5/0403 |
| | | | | 74/421 A |
| 2005/0178608 | A1* | 8/2005 | Shiino | B62D 5/0409 |
| | | | | 180/444 |
| 2006/0108884 | A1* | 5/2006 | Shiino | B60T 8/267 |
| | | | | 310/68 B |
| 2011/0066327 | A1* | 3/2011 | Horiuchi | B62D 5/065 |
| | | | | 701/41 |
| 2016/0065030 | A1* | 3/2016 | Fujimoto | B62D 5/0409 |
| | | | | 310/68 D |
| 2023/0033401 | A1* | 2/2023 | Wang | B62D 5/001 |

FOREIGN PATENT DOCUMENTS

| | | | | | |
|---|---|---|---|---|---|
| CN | 110709310 A | * | 1/2020 | | H02K 5/10 |
| DE | 102005007357 A1 | | 9/2005 | | |
| DE | 102008018477 A1 | * | 6/2009 | | B62D 5/0406 |
| DE | 102010041744 A1 | * | 4/2012 | | B62D 5/0421 |
| DE | 102010049999 A1 | | 5/2012 | | |
| DE | 102016205669 A1 | * | 10/2016 | | H02K 5/04 |
| DE | 112020006044 T5 | * | 12/2022 | | H02K 11/33 |

(Continued)

*Primary Examiner* — Drew J Brown
(74) *Attorney, Agent, or Firm* — Kristin L. Murphy

(57) ABSTRACT

The disclosure describes a housing cover unit for a transmission and power steering drive housing, comprising a housing cover and a control unit for regulating the position and/or speed of a power steering drive. To this end, the control unit is arranged on and attached to the housing cover. Also shown is a steering unit for a vehicle.

12 Claims, 1 Drawing Sheet

(56)          References Cited

FOREIGN PATENT DOCUMENTS

| EP | 2179909  | A2 | * | 4/2010  | ........... | B62D 5/0406 |
| EP | 3695955  | B1 |   | 8/2021  |             |             |
| EP | 4096073  | A1 | * | 11/2022 | ............. | H02K 11/33  |
| JP | 2010100217 | A | * | 5/2010  | ........... | B62D 5/0409 |
| JP | 6514136  | B2 | * | 5/2019  | ............. | H02K 5/225  |

\* cited by examiner

HOUSING COVER UNIT FOR A TRANSMISSION AND POWER STEERING DRIVE HOUSING, AND STEERING UNIT FOR A VEHICLE

CROSS-REFERENCE TO RELATED APPLICATION

This application claims priority to German Priority Application No. 102021214051.3, filed Dec. 9, 2021, the disclosure of which is incorporated herein by reference in its entirety.

TECHNICAL FIELD

The disclosure relates to a housing cover unit for a transmission and power steering drive housing, and a steering unit for a vehicle.

BACKGROUND

Such steering units are known from the prior art. In everyday speech, they are frequently designated power steering systems because of the power steering drive.

These steering units comprise, amongst other things, a housing, a steering column and a power steering drive which is coupled to the steering column via a transmission and is driven by an electric control unit. Known housings are often designed in two parts, there being a separate transmission housing and a separate power steering drive housing Known steering units of this type are frequently configured in such a way that they can be used in various vehicles with comparatively little effort on adaptation. At the same time, in the steering unit sector, it is attempted to keep an associated installation volume as small as possible in order that only a comparatively small installation space within the vehicle is demanded by the steering unit.

Added to the desired low installation volume of a power steering drive is the fact that known control units from the prior art often tend to heat up excessively, such that sensitive electronic components of the control unit can be damaged.

SUMMARY

The prior art fails to show an improved steering unit which is compact and has improved heat management of the control unit.

According to the disclosure, a housing cover unit for a transmission and power steering drive housing is provided, comprising a housing cover and a control unit for regulating the position and/or speed of a power steering drive. To this end, the control unit is arranged on and attached to the housing cover. The control unit is thus integrated in the housing cover. This arrangement is particularly space-saving as compared with conventional arrangements on the housing of a transmission or of a power steering drive. In addition, the waste heat generated by the control unit can be dissipated to the housing cover, which serves as a heat sink.

According to the disclosure, the control unit comprises at least two components, which are arranged on and attached to the housing cover in a physically distributed manner. As a result of the distributed arrangement on the housing cover, the temperature distribution of highly heat-emitting components of the control unit, such as, for example, resistors or coils, can be improved via the housing cover. In this way, the probability of failure of heat-sensitive electronic components of the control unit is reduced.

In particular, it is also conceivable that the control unit comprises more than two components, which are all arranged and fixed on the housing cover in a physically distributed manner. With a finely structured distribution of the control unit into a plurality of components, a still better heat distribution on the housing cover can be achieved.

The housing cover can have a receiving space for at least one component of the control unit, which is accessible from outside only via a single insertion opening, via which at least one component of the control unit can be inserted into the receiving space, wherein the receiving space is situated at the side of the transmission and power steering drive housing.

On the one hand, the receiving space is easily accessible from outside and, on the other hand, the at least one component of the control unit is enclosed well by the receiving space, so that a good transfer of heat between the housing cover and the at least one component is achieved and the at least one component is seated safely in the housing.

Of course, the at least one component of the control unit that is described previously and below can also mean the entire control unit.

According to the disclosure, the housing cover has an outer side and an opposite inner side, and the at least one component of the control unit is arranged on the outer side, which is better for the dissipation of heat. The outer side according to the present invention is defined in that in an installed state, in which the housing cover unit with the housing cover is mounted on the transmission and power steering drive housing, the side of the housing cover that faces away from the transmission and power steering drive housing is meant. When at least one component is arranged on the outer side the latter is always accessible for possible maintenance, so that the housing cover unit does not have to be removed from the transmission and power steering drive housing. Thus, an uncomplicated replacement of defective electronic components of the control unit is made possible.

According to the disclosure, the inner side of the housing cover has a centering collar for centering the housing cover unit on the transmission and power steering drive housing, and at least one component of the control unit is arranged in the radial direction outside the centering collar on the housing cover. The centering collar creates the possibility of radially centering the housing cover on the transmission and power steering drive housing. Subsequently, simple mounting of a driveshaft in the housing cover is made possible by the centering. In addition, easy accessibility from two opposite sides is achieved by the described arrangement of the control unit. Therefore, the outer side of the housing cover can have an insertion opening into which the control unit is inserted, and a plug connector can be arranged in a space-saving manner on a side of the housing cover that is opposite to the insertion opening.

The housing cover can have an opening for a driveshaft to be led through, and the housing cover unit comprises a motor position sensor to detect the position and/or the speed of a driveshaft led through the opening in the housing cover. With the integration of the motor position sensor on the housing cover, laborious cable guidance between control unit and motor position sensor is avoided.

According to the disclosure, the object is further achieved by a steering unit for a vehicle, comprising a steering column, a transmission and a power steering drive coupled to the steering column via the transmission, a one-piece transmission and power steering drive housing and a housing cover unit according to the disclosure. The transmission and power steering drive housing receives the transmission and the power steering drive and has a mounting opening for the introduction of the power steering drive, wherein the housing cover unit is attached to the transmission and power steering drive housing and closes the mounting opening.

By using the steering unit, the steering torque applied by a vehicle driver, for example via a steering wheel, can be amplified, so it is less demanding for the vehicle driver to steer the vehicle. Usually, in known separately designed transmission housings and power steering drive housings, exact positioning of the two housings relative to each other during assembly is necessary. The one-piece transmission and power steering drive housing renders such complicated and costly positioning superfluous.

According to the disclosure, the transmission can comprise a worm gear and a driveshaft. The worm gear, used as an output drive gear of the transmission, is co-rotationally coupled to the steering column, and the driveshaft is co-rotationally coupled to a rotor of the power steering drive, the driveshaft being provided with worm gearing and meshing with the worm gear. The structure described permits a torque flow from the power steering drive to the steering column, which serves as an output shaft. The worm gearing located in between, permits reduction in the motor rotational speed, as a result of which the output torque at the steering column is increased in comparison with the drive torque of the power steering drive.

According to the disclosure, the driveshaft can merge into the worm gearing in one piece. In this way, a joint in between is saved in comparison with when two-parts are used, so that the outlay on fabrication is lowered and the number of parts is reduced.

Alternatively, the driveshaft can comprise two parts, where the two parts are co-rotationally coupled to each other. The rotor of the power steering drive is co-rotationally coupled to the first part, and the second part is provided with the worm gearing. The two-part design in turn offers the advantage of increased flexibility in production. Here, multiple variants of a steering unit which, for example, differ from one another only in a different ratio of the transmission with different worm gearing, can be produced simply and inexpensively.

According to the disclosure, the driveshaft is supported via two bearing units, the rotor of the power steering drive and the worm gearing being arranged on the driveshaft between the two bearing units. As a result of a relatively large distance between the two bearing units, the steering unit can be used with a high-power transmission which transmits high torques.

The steering unit can comprise a sealing element. In addition, the one-piece transmission and power steering drive housing has a receiving space for the power steering drive and a receiving space for the transmission. The sealing element is seated on the driveshaft between the worm gearing and the rotor and seals off the two receiving spaces from each other. As a result of the seal between the two receiving spaces, no transmission oil can get from the receiving space of the transmission into the receiving space of the power steering drive. There may be contaminants, for example in the form of abraded transmission particles, in the oil, which would damage the electric power steering drive. In addition, overloading of the power steering drive is avoided, since the transmission oil checks the power steering drive.

BRIEF DESCRIPTION OF DRAWINGS

The steering unit will be explained below by using the appended drawings, in which.

DETAILED DESCRIPTION

Figure 1:
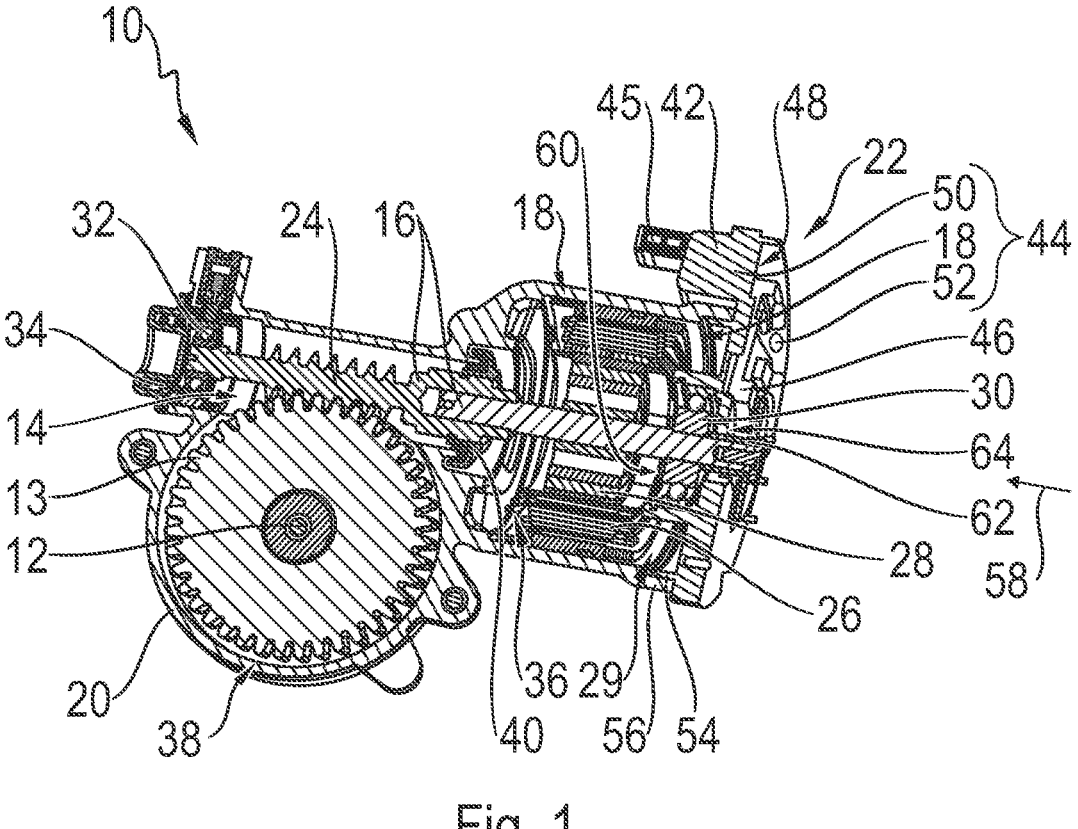
FIG. 1 shows a steering unit according to the disclosure in a sectional view.
Figure 2:
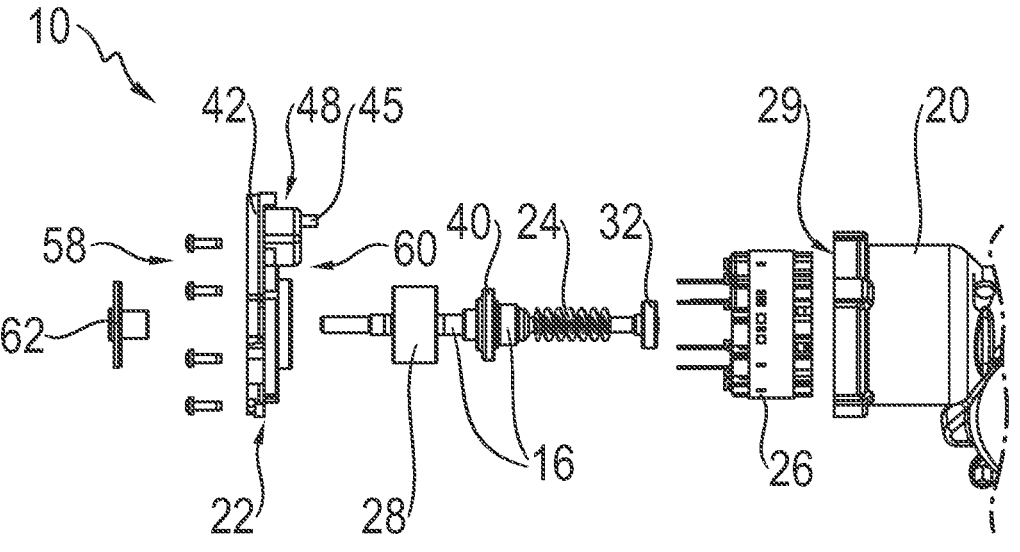
FIG. 2 shows the steering unit according to the disclosure from FIG. 1 in an exploded view, part of the steering unit which, amongst other things, comprising a transmission, not being illustrated.

FIGS. 1 and 2 show a steering unit 10 according to the disclosure having a steering column 12, a worm gear 13, a transmission 14, a driveshaft 16, a power steering drive 18, a one-piece transmission and power steering drive housing 20 and a housing cover unit 22 according to the disclosure.

The steering unit 10 is used to amplify a steering force or a steering torque and therefore assist a driver of a vehicle when travelling in a curve. The driver of the vehicle thus does not have to apply all of the necessary steering force, for example via a steering wheel of a vehicle.

In order to be able to achieve such steering force amplification, the electrically operated power steering drive 18 drives the driveshaft 16, which has a worm gearing 24 and meshes with the worm gear 13.

The worm gear 13 is in turn co-rotationally connected to the steering column 12. The worm gear 13 thus functions as an output drive gear of the transmission 14 and drives the steering column 12 co-rotationally coupled to the worm gear 13. The torque on the steering column 12 can then be tapped off by a higher-order steering system of a vehicle.

To produce the torque, the power steering drive 18 in turn comprises a stator 26 and a rotor 28, wherein the stator 26 is introduced into the transmission and power steering drive housing 20 via a mounting opening 29. After the stator 26 has been joined to the transmission and power steering drive housing 20, these two components 20, 26 are co-rotationally connected to each other.

The rotor 28 is in turn co-rotationally connected to the driveshaft 16. During the operation of the steering unit 10, the stator 26 and rotor 28 interact in such a way that a torque is induced in the rotor 28 and is then transmitted to the driveshaft 16.

Here, the driveshaft 16 is designed in two parts. The first part is distinguished by the fact that it is co-rotationally connected to the rotor 28. In addition, the second part is provided with the worm gearing 24, the first part of the driveshaft 16 being co-rotationally connected to the second part of the driveshaft 16.

Alternatively, however, it is also conceivable that the driveshaft 16 is designed in one piece.

The driveshaft 16 is rotatably mounted between a first and a second bearing unit 30, 32, wherein an axial preloading force is applied to the two bearing units 30, 32 via a compression spring 34.

The two bearing units 30, 32 are designed as ball bearings, the first bearing unit 30 being accommodated by the housing cover unit 22. A first axial end of the driveshaft 16 is supported in the housing cover unit 22 via the first bearing unit 30.

The second bearing unit 32 is accommodated by the transmission and power steering drive housing 20 and in turn supports a second axial end of the driveshaft 16.

The transmission and power steering drive housing 20 protects the internal components of the steering unit 10 from external environmental influences and creates a structural connection of all the components of the steering unit 10. For this purpose, the transmission and power steering drive housing 20 comprises a receiving space 36, which receives the power steering drive 18, and a receiving space 38 in which the transmission 14 is located.

To separate the two receiving spaces 36, 38 from each other, a sealing element 40 is seated on the driveshaft 16, a seal between the driveshaft 16 and transmission and power steering drive housing 20 being produced thereby. The sealing element 40 is arranged on the driveshaft 16 for this purpose, between the rotor 28, which is seated on the driveshaft 16, and the worm gearing 24 of the driveshaft 16.

No transmission oil which is located in the receiving space 38 of the transmission 14 and contains possible contaminants passes through the sealing element 40 into the receiving space 36 of the power steering drive 18.

The transmission and power steering drive housing 20 is designed in one piece. The power steering drive 18 and transmission 14 therefore have a common and not a separate housing, so that an interface between the two housings, for example via a flanged connection, is dispensed with.

At the same time, however, the term "one-piece transmission and power steering drive housing 20" does not rule out any possibly necessary housing division for installing the transmission 14 into the transmission and power steering drive housing 20. However, this housing division can also be present in the case of a separately formed power steering drive housing and a separately formed transmission housing.

The housing cover unit 22 comprises a housing cover 42, a control unit 44, a plug connection 45, a motor position sensor 46 and the first bearing unit 30.

The housing cover unit 22 has the task, firstly, of closing the transmission and power steering drive housing 20 in order that no dirt can get into the interior of the transmission and power steering drive housing 20. Any contaminants that may be present could block or damage the transmission 14 or the power steering drive 18.

Furthermore, the housing cover unit 22 is used to accommodate the first bearing unit 30 and therefore to support the driveshaft 16 in the housing cover 42.

In addition, space-saving integration of the control unit 44 on the housing cover is made possible by the housing cover unit 22, in which, in addition, a uniform temperature distribution on the housing cover 42 is achieved.

The housing cover 42 has a receiving space 48 which accommodates a first part 50 of the control unit 44. The first part 50 comprises larger electronic components of the control unit 44, such as, for example, an electronic filter circuit.

Besides the first part 50, the control unit 44 has a second part 52. The second part 52 comprises further electronic components of the control unit 44, wherein the division of the components here is, for example, carried out in such a way that the heat flows given off by the first and second part 50, 52 are approximately equally large.

The second part 52 is arranged on the housing cover 42 so as to be physically separated from the first part 50, in order to achieve the above-described better heat distribution over the housing cover 42. In addition, provision can be made for the two parts 50, 52 to be arranged as far as possible from each other on the housing cover 42.

To accommodate the second part 52 on the housing cover 42, appropriate structures such as sockets or recesses can be provided on the housing cover 42.

Optimally, the control unit 44 is divided up in a more finely structured way, into more than two parts 50, 52, which can be arranged as uniformly as possible on the housing cover 42.

The receiving space 48 is provided in the radial direction outside a centering collar 54 of the housing cover 42.

The centering collar 54 is accommodated by a housing extension 56 of the transmission and power steering drive housing 20 and centers the housing cover 42 on the transmission and power steering drive housing 20. This is relevant for the support of the driveshaft 16, since the support is provided via the housing cover 42.

The housing cover 42 has an outer side 58 and an inner side 60, wherein the outer side 58 is defined in that, when the housing cover unit 22 is installed on the transmission and power steering drive housing 20, it faces away from the transmission and power steering drive housing 20. The inner side 60 is opposite to the outer side 58 and, when the housing cover unit 22 is installed, faces the transmission and power steering drive housing 20, see FIG. 2.

The receiving space 48 is freely accessible from the outer side 58, so that the first part 50 of the control unit 44 can be inserted from the outer side 58.

With the exception of the outer side 58, the receiving space 48 encloses the first part 50 of the control unit 44 completely, so that the latter is integrated optimally in the housing cover unit 22. Hereby, the waste heat arising in operation can be carried away well via the housing cover 42.

In addition, the housing cover unit 22 has the freely accessible plug connection 45, which is arranged on the inner side 60 of the housing cover 42 in the area of the receiving space 48.

The plug connection 45 is used to supply the control unit 44 and the power steering drive 18 with electrical power. Furthermore, data can be transmitted to higher-order electronics of the vehicle.

The motor position sensor 46 is attached to the outer side 58 of the housing cover unit 22. Together with a sensor target 62, which is arranged at the end of the driveshaft 16, the speed and the position of the driveshaft 16 can be determined.

For exact measurement of the motor speed and simple accessibility to the motor position sensor 46 and the sensor target 62, these are arranged on the outer side 58 of the housing cover 42. In order to lead the driveshaft 16 through to the outer side 58, the housing cover 48 has an opening 64.

The motor position sensor 46 is connected to the control unit 44, so that the control unit 44 can regulate the speed and/or position of the driveshaft 16. For this purpose, the control unit 44 provides the necessary power to the power steering drive 18.

The receiving space 48 can be formed when the housing cover 42 has a bulge on the inner side 60 which, from the outer side 58, forms the receiving space 48.

The invention claimed is:

1. A housing cover unit for a transmission and power steering drive housing, comprising a housing cover and a control unit for regulating a position or a speed of a power steering drive, wherein the control unit comprises at least two components, at least one of which is a heat-emitting component, wherein the at least two components are arranged on and attached to the housing cover in a physically distributed manner such that at least one heat-emitting component is thermally coupled to the housing cover, wherein the housing cover is configured to transmit heat from the heat-emitting component to the environment, wherein the housing cover has a receiving space for at least one component of the control unit, the receiving space being accessible from outside only via a single insertion opening, and wherein the housing cover unit further comprises a motor position sensor attached to the housing cover and electrically connected to the control unit, the motor position sensor being configured to detect a position or a speed of a driveshaft led through the opening in the housing cover.

2. The housing cover unit as claimed in claim 1, wherein other at least one component of the control unit can be inserted into the receiving space only via the single insertion opening.

3. The housing cover unit as claimed in claim 2, wherein the receiving space is situated at a side of the transmission and power steering drive housing.

4. The housing cover unit as claimed in claim 1, wherein the housing cover has an outer side and an opposite inner side, and the at least one component of the control unit is arranged on the outer side.

5. The housing cover unit as claimed in claim 4, wherein the inner side of the housing cover has a centering collar for centering the housing cover unit on the transmission and power steering drive housing, and at least one component of the control unit is arranged in the radial direction outside the centering collar on the housing cover.

6. A steering unit for a vehicle, comprising a steering column, a transmission and a power steering drive coupled to the steering column via the transmission, a one-piece transmission and power steering drive housing and a housing cover unit as claimed in claim 1, wherein the transmission and power steering drive housing receives the transmission and the power steering drive and has a mounting opening for the introduction of the power steering drive, and wherein the housing cover unit is attached to the transmission and power steering drive housing and closes the mounting opening.

7. The steering unit as claimed in claim 6, wherein the transmission comprises a worm gear and a driveshaft, wherein the worm gear, used as an output drive gear of the transmission, is co-rotationally coupled to the steering column, and the driveshaft is co-rotationally coupled to a rotor of the power steering drive, and wherein the driveshaft is provided with a worm gearing and meshes with the worm gear.

8. The steering unit as claimed in claim 7, wherein the driveshaft merges into the worm gearing in one piece.

9. The steering unit as claimed in claim 7, wherein the driveshaft is arranged in two parts, and the two parts are co-rotationally coupled to each other, wherein the rotor of the power steering drive is co-rotationally coupled to the first part, and the second part comprises the worm gearing.

10. The steering unit as claimed in claim 7, wherein the driveshaft is supported via two bearing units, wherein the rotor of the power steering drive and the worm gearing are arranged on the driveshaft between the two bearing units.

11. The steering unit as claimed in claim 6, wherein the steering unit comprises a sealing element, and the one-piece transmission and power steering drive housing comprises a receiving space for the power steering drive and a receiving space for the transmission, wherein the sealing element is seated on a driveshaft between a worm gearing and a rotor and seals off the two receiving spaces from each other.

12. The steering unit as claimed in claim 6, wherein the transmission and power steering drive housing is a one-piece housing.

\* \* \* \* \*